UNITED STATES PATENT OFFICE.

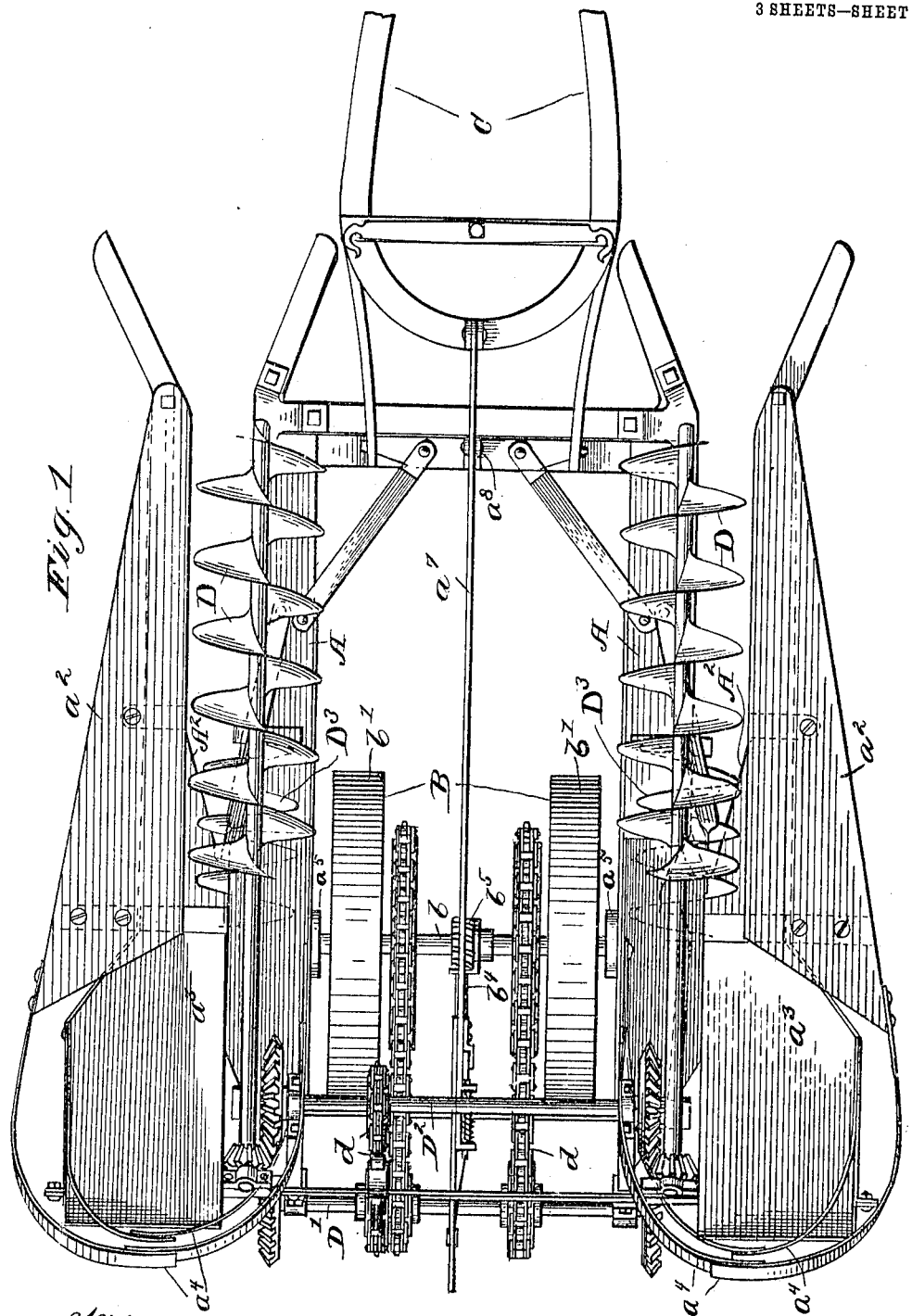

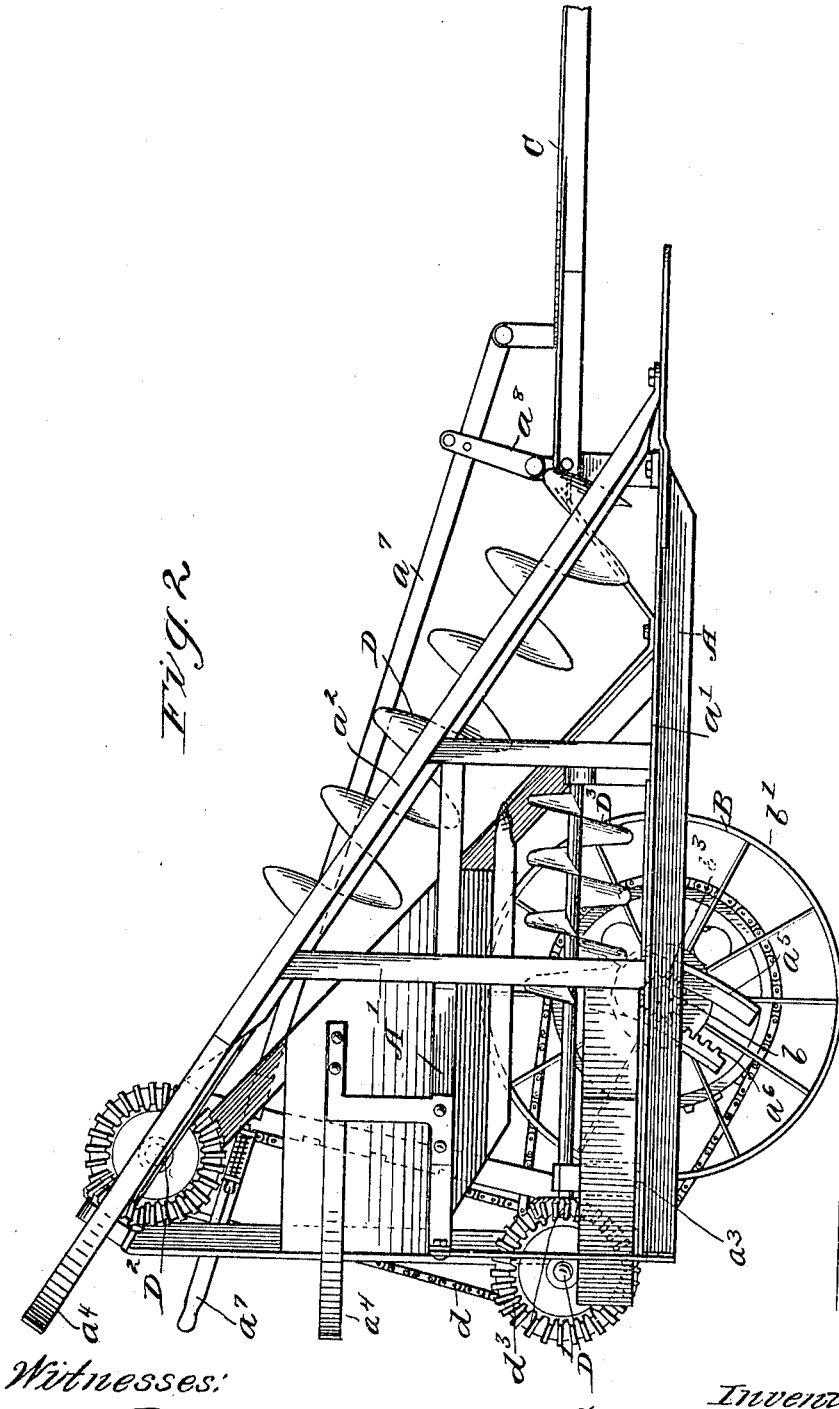

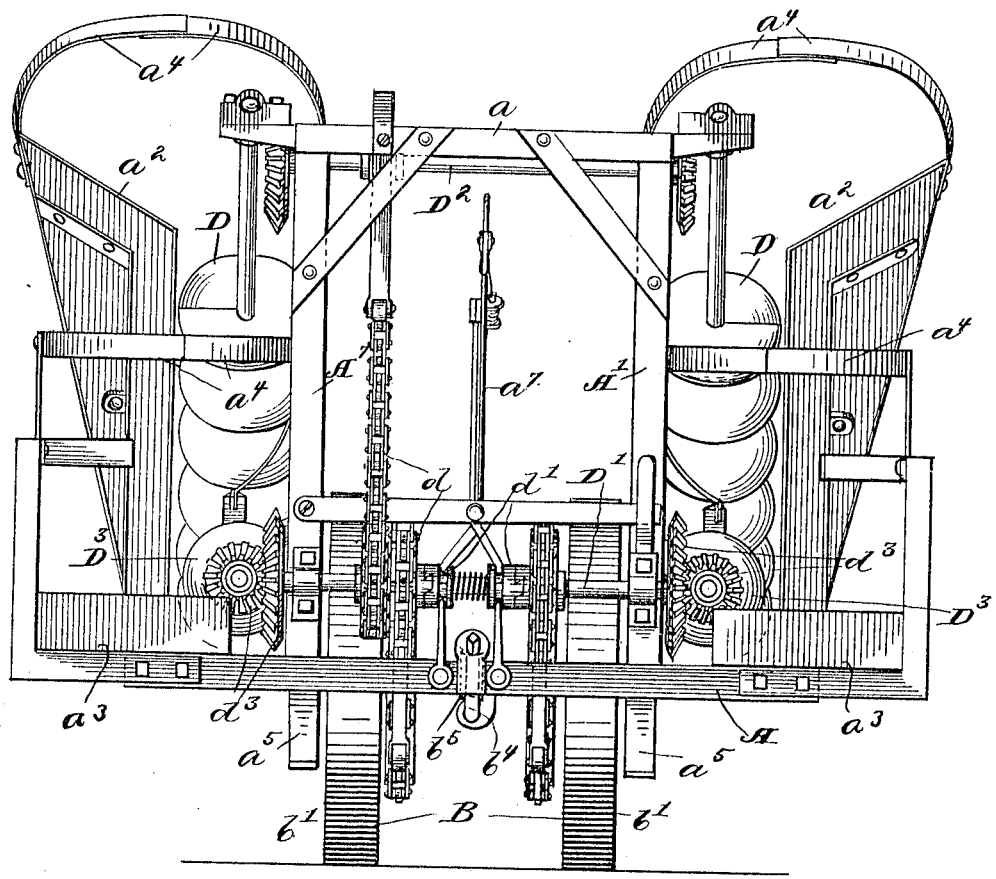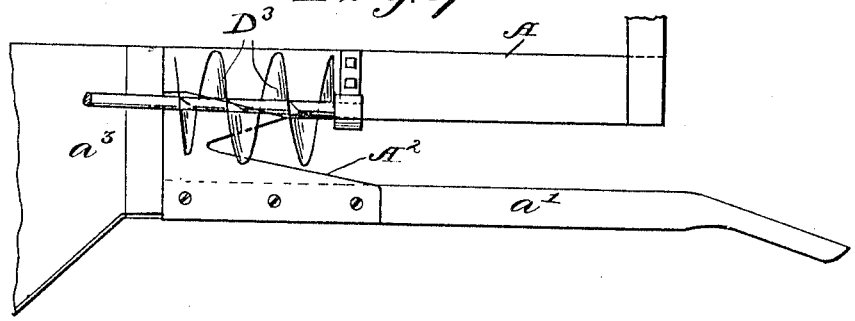

EDWARD JESCHKE, OF BELLEVUE, OHIO, ASSIGNOR TO THE JESCHKE MANUFACTURING COMPANY, OF BELLEVUE, OHIO, A CORPORATION OF OHIO.

HARVESTER.

954,438. Specification of Letters Patent. Patented Apr. 12, 1910.

Application filed March 6, 1909. Serial No. 481,578.

*To all whom it may concern:*

Be it known that I, EDWARD JESCHKE, a citizen of the United States, and a resident of Bellevue, county of Huron, and State of Ohio, have invented a new and useful Improvement in Harvesters, of which the following is a specification, the principle of the invention being herein explained, and the best mode in which I have contemplated applying that principle, so as to distinguish it from other inventions.

The present invention, relating as indicated to harvesters, has regard more particularly to machines for harvesting corn, sorghum or other like crops that have more or less stalwart stalks. One successful type of harvester adapted for the handling of crops of this kind is that shown in U. S. Patent No. 763,569, dated June 28, 1904, and the object of the present invention is the further improvement of the machine therein shown, with a view both to render the same more readily adjustable to various conditions of service, and to insure the cutting of the stalks and their maintenance in an upright position in the stalk receptacle, preparatory to their being taken from the machine and shocked or otherwise disposed of.

To the accomplishment of these and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings:—Figure 1 is a plan view of a corn harvesting machine embodying my several improvements; Fig. 2 is a side elevational view of the same; Fig. 3 is a rear elevation thereof; and Fig. 4 is a plan view of the lower portion of the stalk guide-way and certain accessory parts.

The frame work of the machine comprises a platform or base A, of rectangular shape pivotally supported about the axis of a truck B consisting of a transverse shaft $b$ and two driving wheels $b'$ fixedly mounted thereon. Triangular side members $A'$ joined at the rear by a suitable cross piece $a$ complete the frame structure, and form, in connection with fingers $a'$ and inclined boards $a^2$, laterally spaced from the sides of the base, guide-ways along which the stalks to be cut are designed to be received as the machine advances along the rows of corn. To the rear of each such guide-way, the base A of the machine is extended to provide a supplementary platform or table $a^3$, Figs. 1 and 4, for the reception of the stalks, as they are severed in the manner presently to be explained. The stalks thus received onto said table are prevented from falling off backward from the machine by pairs of over-lapping resilient arms $a^4$ disposed transversely of the guide-way and at different heights above the table.

Vertical adjustment of the entire frame with respect to the truck axis, about which it is pivoted, is secured by providing brackets $a^5$ for mounting the frame on the truck, said brackets having racks $a^6$ that engage with pinions $b^3$ upon the truck axle. (See Fig. 2.) By rotation of pinions $b^3$ variation in elevation of the frame may be secured, such rotation being effected in familiar fashion by a worm-shaft $b^4$ engaging with worm $b^5$ mounted upon said axle.

Suitably connected with the front end of the machine base are the rear portions of a pair of vehicle shafts C or equivalent draft connections, the angular relation of which to the machine base A is determined by a lever $a^7$ pivotally connected by means of a link $a^8$ with the forward end of the base and directly pivoted to said shafts, so that by suitable adjustment of its rear end, the base in question may be tilted forwardly or preserved horizontal to suit the varying condition of the stalks being cut. Such cutting is effected incidentally to the advance of the machine along the rows of corn, or other crop, by suitable cutting blades $A^2$ angularly disposed across the rear end of the guide-ways formed laterally of the base on each side by the fingers $a'$ and $a^2$ (see Figs. 1 and 4) in the manner previously described. This cutter does not differ essentially from that illustrated in the patent of reference, and, as there, I employ a screw shaft, or spiral conveyer D for feeding the stalks along the guide-way and onto the knife. This conveyer inclines upwardly and rearwardly adjacent to such guide-way, its forward end being stepped in the forward end of base A and its rear end being mounted in the cross bar $a$ that joins the side members $A'$ of the frame. Rotation of such conveyers is derived from the truck B by suitable sprocket gear connections $d$ with the truck shaft $b$ through intermediate driving shafts $D'$ and $D^2$, such connection being controlled by clutches $d'$ on shaft $D'$ as will be readily understood. In addition to such inclined conveyers D, I mount in the present machine, two other conveyers $D^3$ that are similarly in alinement with the guide-ways but which lie substantially parallel with the base and adjacent to the cutting blades $A^2$. The rear ends of said conveyers $D^3$ extend into proximity with transverse driving shaft $D'$ and are directly connected therewith by beveled gears $d^3$.

Having thus described the general construction and arrangement of my machine, the manner of its operation may be briefly indicated. The elevation of the machine base, controlled by adjustment of the worm shaft $b^4$ is adjusted to provide for the cutting off of the stalks at the desired elevation.

It will be obvious that, owing to the location of the knife blades, any angular adjustment of the frame base by tilting the same more or less with respect to the shafts, will not greatly vary the height of stubble determined by adjustment of the elevation of the base. Such tilting, however, will be effective to lower or raise the forward end of the guide-ways so as to pick up, when necessary, stalks that are inclined or blown over. In fact such forward ends of the guide-ways can be approached very closely to the ground should occasion demand. Whether the frame be thus inclined or not, the advance of the machine along a row will bring successive stalks in such row into engagement with the upper, inclined conveyer, the operation of which will be to raise such stalk, or if vertical, to pass the same along practically without disturbing it. Similarly the lower conveyer comes into play, as the machine proceeds, engaging the lower portions of the stalks, and feeding the same against the cutting blades. Their severance from the stubble is hence assured, and as the cut off ends are deposited upon the platform $a^3$ constituting the bottom of the stalk receptacle, the upper conveyer similarly discharges their upper portions into such receptacle. Removal from the receptacle is secured by simply gathering in the arms the stalks that have accumulated therein, and then withdrawing the same, the spring holders $a^4$ opening outwardly under such circumstances, although normally effective to retain the stalks against accidental discharge from the receptacle.

It will thus be seen that, without sacrificing the simplicity of structure characterizing the earlier machine, I have provided several highly useful adjustments rendering such machine more readily adaptable to the varying requirements of different field conditions. At the same time, by the provision of the auxiliary feeding means, specifically conveyers $D^3$, not only is the even advance of both the upper and lower portions of the stalks onto the stalk receptacles assured, but such conveyers directly coöperate with the cutting blades to sever the stalks. By extending the rear ends of the conveyers beyond the blades, as shown, they further serve the important function of pushing back the butts of the stalks after they have been severed, thus acting as a sort of packer and permitting the storage of a greater number of stalks in the stalk receptacles before it becomes necessary to unload the latter. The butts are obviously at the same time kept away from the knives after being cut off. Finally the resilient arms $a^4$ provide an extremely simple, yet effective, arrangement for removably holding the stalks in such receptacles.

Other modes of applying the principle of my invention may be employed instead of the one explained, change being made as regards the mechanism herein disclosed, provided the means stated by any one of the following claims or the equivalent of such stated means be employed.

I therefore particularly point out and distinctly claim as my invention:—

1. In a machine of the class described, a stalk guide-way provided with cutting means, a stalk-receptacle arranged in the rear of said guide-way, and two spiral conveyers respectively inclined upwardly and rearwardly and arranged substantially horizontally to engage and feed the upper and lower portions of stalks along said guide-way.

2. In a machine of the class described, a stalk guide-way, a cutting blade disposed at an angle across said guide-way, a spiral conveyer arranged substantially horizontally and substantially in alinement with said way adapted to engage and feed stalks therealong and against said blade, and another spiral conveyer inclining upwardly with respect to said first conveyer and adapted to engage and feed the upper portions of such stalks along said way, so as to preserve the same upright.

3. In a machine of the class described, the combination of a truck, a frame mounted upon said truck so as to be pivotal about a transverse axis, means for securing said frame in various angular positions about said axis, a stock guide way in said frame disposed transversely of such axis, a cutter blade disposed at an angle across said way, and two spiral conveyers respectively inclined upwardly and rearwardly, and arranged substantially horizontally to engage and feed the upper and lower portion of stocks along said guide way.

4. In a machine of the class described, the combination of a truck, a frame mounted upon said truck, so as to be pivotal about a transverse axis, means for securing said frame in various angular positions about such axis, means for raising or lowering said frame with respect to such axis, a stock-guide way in said frame disposed transversely of such axis, a cutter blade disposed at an angle across said way, and two spiral conveyers respectively inclined upwardly and rearwardly, and arranged substantially horizontally to engage and feed the upper and lower portions of stocks along said guide way.

Signed by me this 1st day of March, 1909.

EDWARD JESCHKE.

Attested by—
J. P. VICKERY,
R. N. LEONARD.